(12) United States Patent
Utsunomiya

(10) Patent No.: US 8,749,827 B2
(45) Date of Patent: Jun. 10, 2014

(54) IMAGE PROCESSING APPARATUS, SERVER APPARATUS, CONTROL METHOD THEREOF, AND STORAGE MEDIUM

(75) Inventor: Takehito Utsunomiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/400,998

(22) Filed: Feb. 21, 2012

(65) Prior Publication Data

US 2012/0218598 A1 Aug. 30, 2012

(30) Foreign Application Priority Data

Feb. 24, 2011 (JP) ................................ 2011-038543

(51) Int. Cl.
*G06F 15/00* (2006.01)
(52) U.S. Cl.
USPC ......................................................... 358/1.15
(58) Field of Classification Search
USPC ....................................................... 358/1.15
See application file for complete search history.

(56) References Cited

U.S. PATENT DOCUMENTS

| 2002/0046238 A1* | 4/2002 | Estavillo et al. ............... 709/203 |
| 2003/0076522 A1* | 4/2003 | Simpson et al. ............. 358/1.14 |
| 2003/0137691 A1* | 7/2003 | Tanaka ......................... 358/1.15 |
| 2003/0234957 A1* | 12/2003 | Ohara ........................... 358/1.15 |
| 2011/0134456 A1* | 6/2011 | Tsujimoto .................... 358/1.13 |

FOREIGN PATENT DOCUMENTS

JP 2006-127503 A 5/2006

* cited by examiner

*Primary Examiner* — Saeid Ebrahimi Dehkordy
(74) *Attorney, Agent, or Firm* — Canon U.S.A., Inc., IP Division

(57) ABSTRACT

When a web server generates a preview screen, the web server transmits conversion information (e.g., an image size) for generating a preview image to a multifunction peripheral (MFP). The MFP generates converted image data using the conversion information, and transmits the converted image data to a web server.

12 Claims, 10 Drawing Sheets

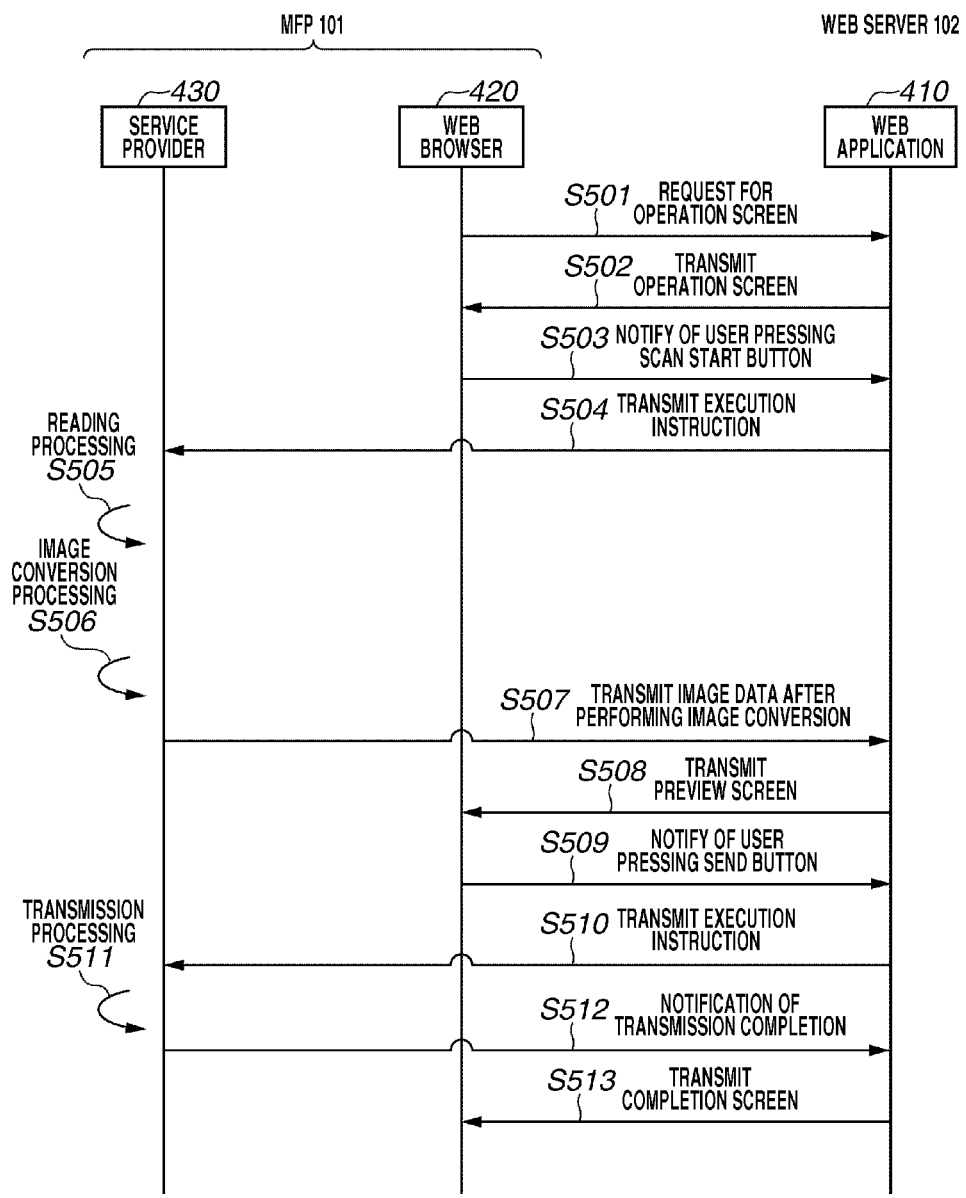

MENU SCREEN

Scan to Send SCREEN

PREVIEW SCREEN

COMPLETION SCREEN

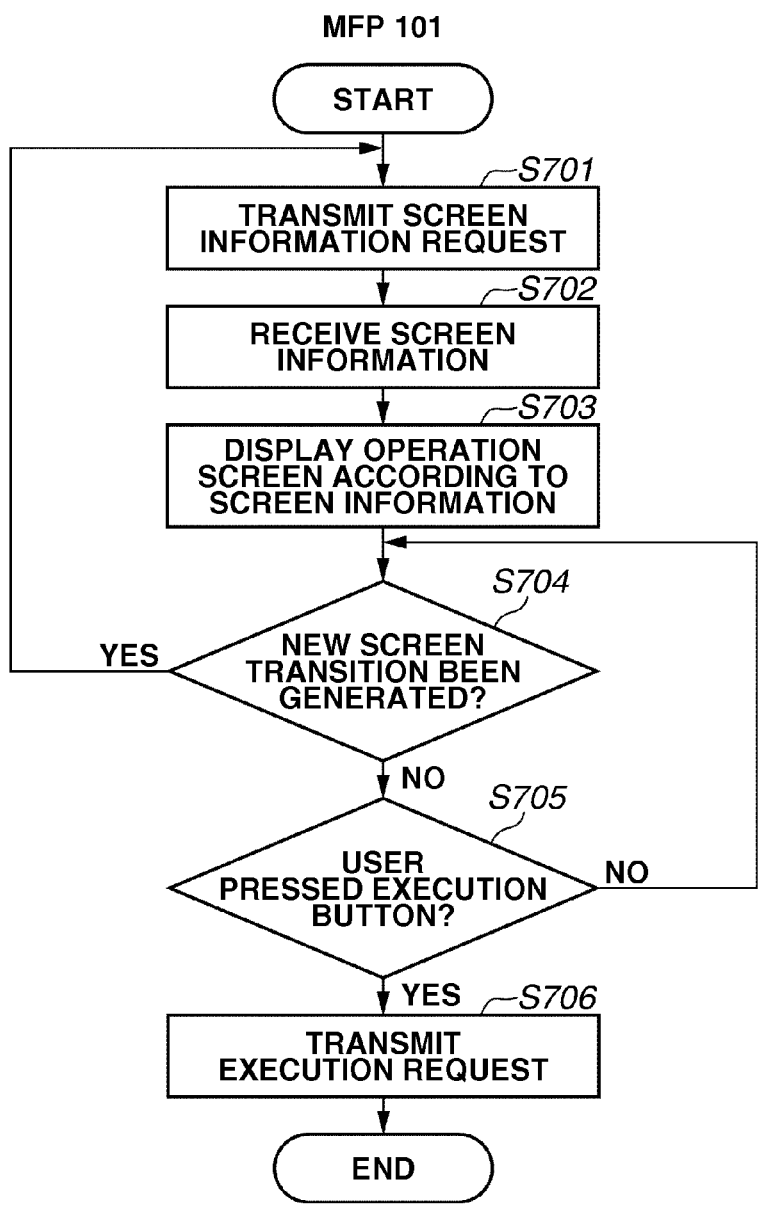

IMAGE PROCESSING APPARATUS, SERVER APPARATUS, CONTROL METHOD THEREOF, AND STORAGE MEDIUM

BACKGROUND OF THE INVENTION

1. Field of the Invention

The present invention relates to an image processing apparatus, a server apparatus, a control method thereof, and a storage medium.

2. Description of the Related Art

Recently, multifunction peripherals (MFPs) including a scanner and a printer have also included a web browser. These MFPs display an operation screen provided by a web server on the web browser of the MFP, and receives various instructions from a user.

Japanese Patent Application Laid-Open No. 2006-127503 discusses a technique in which a web server provides an operation screen to which the user inputs instructions for using each function of the MFP. More specifically, the user inputs an instruction via the operation screen displayed by the web browser in the MFP. The web server, which receives a notification, then requests the MFP to perform various processes according to the content of the instruction input by the user. The MFP receiving the request thus performs the requested process. As a result, it becomes unnecessary to store all of menu data for operating the MFP in the MFP. Further, the menu data can be easily changed on the web server.

According to Japanese Patent Application Laid-Open No. 2006-127503, the MFP displays the operation screen using screen information provided by the web server. If the user then desires to display the image data stored in the MFP as a preview image on the operation screen of the MFP, it becomes necessary for the MFP to transmit the image data to the web server, and to generate the screen information including the preview image using the image data received by the web server. In such a case, some issues can occur.

For example, if an image size of the image data transmitted from the MFP to the web server is too large to be used as the preview image, network traffic increases. If the image size of the image data transmitted from the MFP to the web server is too small to be used as the preview image, a preview image of sufficient image quality cannot be provided to the user of the MFP. Further, if the image data received from the MFP is of an inappropriate format to be used as the preview image, it becomes necessary for the web server to change the format. If the web server does not conform to the format of the image data received from the MFP, the image data cannot be processed.

The above-described issues can occur due to the MFP not being able to determine the image size or the format of the image data to be transmitted to the web server.

SUMMARY OF THE INVENTION

One aspect of the present invention is directed to a method in which, when an external apparatus generates the screen information including the preview image of the image data stored in the image processing apparatus, the external apparatus previously transmits to the image processing apparatus the information necessary for generating the preview image.

According to an aspect of the present invention, an image processing apparatus includes a display unit configured to display an operation screen provided by an external apparatus, an interface unit configured to receive information for generating converted image data used in performing preview display of image data from the external apparatus, and an image conversion unit configured to perform an image conversion process on the image data based on the image conversion information and generate converted image data, wherein the interface unit is further configured to transmit the converted image data to the external apparatus, wherein the interface unit is further configured to receive screen information including the converted image data from the external apparatus, wherein the display unit performs preview display of the image data based on the screen information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a sequence diagram illustrating a series of processing procedures according to the first exemplary embodiment of the present invention.

FIG. 7 is a flowchart illustrating the processing procedure performed by the MFP according to the first exemplary embodiment of the present invention.

DESCRIPTION OF THE EMBODIMENTS

Various exemplary embodiments, features, and aspects of the invention will be described in detail below with reference to the drawings.

The exemplary embodiments to be described below do not limit the scope of the invention, and it is not necessary to include all of combinations of the features described in the exemplary embodiments as means for solving the problems in the present invention.

Figure 1:
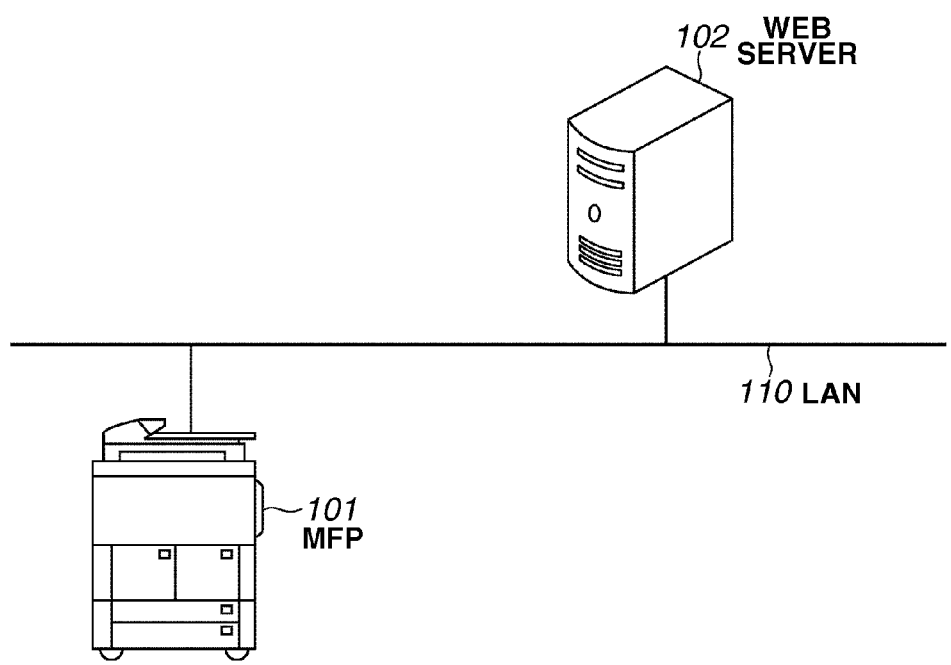
FIG. 1 is an overall view illustrating an image processing system according to a first exemplary embodiment of the present invention.

The first exemplary embodiment will be described below. FIG. 1 is an overall view of the image processing system according to the present exemplary embodiment.

Referring to FIG. 1, an MFP 101 and a web server 102 are connected to and communicable with each other via local area network (LAN) 110. The method of connecting the MFP 101 and the web server 102 is not limited to a LAN, and the present embodiment can be realized by any other connection method, such as the Internet, wireless communication, etc. Further, according to the present exemplary embodiment, the MFP is provided as an example of an image processing apparatus. The image processing apparatus according to the present embodiment is not limited to an MFP, and can be any type of image processing apparatus, such as a single function peripheral (SFP) like a scanner or printer. Furthermore, according to the present exemplary embodiment, the web server is provided as an example of an external apparatus. The external apparatus according to the present embodiment is not limited to the web server, and can be any other device that provides the functionality of a web server, such as another MFP or a personal computer (PC).

Figure 2:
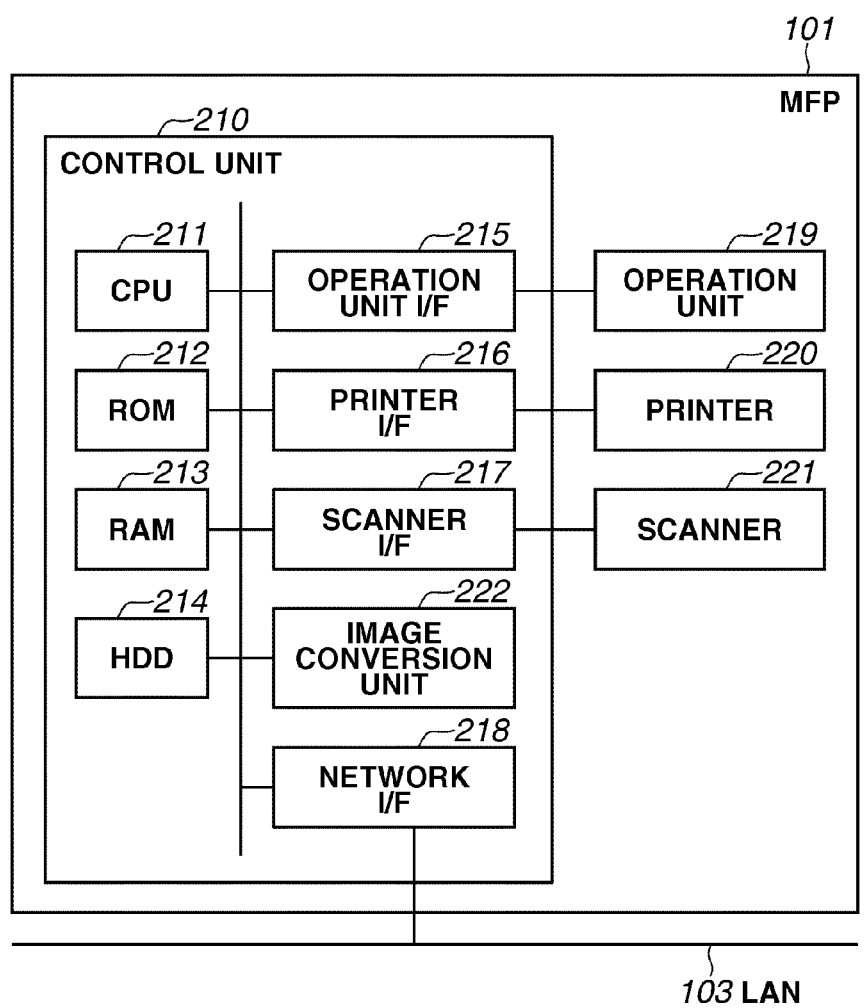
FIG. 2 is a block diagram illustrating a configuration of the MFP according to the first exemplary embodiment of the present invention.

FIG. 2 is a block diagram illustrating a hardware configuration of the MFP 101. Referring to FIG. 2, a control unit 210 includes a central processing unit (CPU) 211. The CPU 211 reads control programs stored in a read-only memory (ROM) 212 or a hard disk drive (HDD) 214 and controls the entire MFP 101. The ROM 212 stores information such as the control programs for executing processes according to each of the flowcharts described below. A random access memory (RAM) 213 is used as a temporary storage area, such as a main memory or a work area of the CPU 211. The HDD 214 stores the control programs and the information for executing the processes according to each of the flowcharts described below, similar to the ROM 212.

An operation unit interface (I/F) 215 connects an operation unit 219 and the control unit 210. The operation unit I/F 215 outputs to the operation unit 219 the screen information to be displayed on the operation unit 219, and transmits to the CPU 211 the information input by the user via the operation unit 219. The operation unit 219 includes a display unit (i.e., a liquid crystal display unit having a touch panel function) and a keyboard. Further, the MFP 101 includes the web browser function. The web browser in the MFP 101 analyzes hypertext markup language (HTML) data received from the web server 102 and is capable of displaying on the liquid crystal display unit in the operation unit 219 an operation screen based on a description in the received HTML data.

A printer I/F 216 connects the printer 220 and the control unit 210. The control unit 210 transfers to the printer 220 via the printer I/F 216 the image data to be printed by the printer 220. The printer 220 is capable of printing the image data on a recording medium such as paper.

A scanner I/F 217 connects the scanner 221 and the control unit 210. The scanner 221 is capable of performing a reading process by reading a document, generating the image data, and inputting to the control unit 210 via the scanner I/F 217 the read image data.

A network I/F 218 connects the control unit 210 (in the MFP 101) to a LAN 103. The network I/F 218 transmits to the external apparatus (e.g., the web server 102 or other MFP) on the LAN 103, various types of information such as the image data and receives various types of information from the external apparatus on the LAN 103.

An image conversion unit 222 is capable of performing an image conversion process (e.g., size conversion and format conversion) on the image data temporarily stored in the RAM 213 or stored in the HDD 214. According to the present exemplary embodiment, the image conversion process is performed by dedicated hardware (i.e., the image conversion unit 222). However, the image conversion process may be performed by the CPU 211 employing software.

Figure 3:
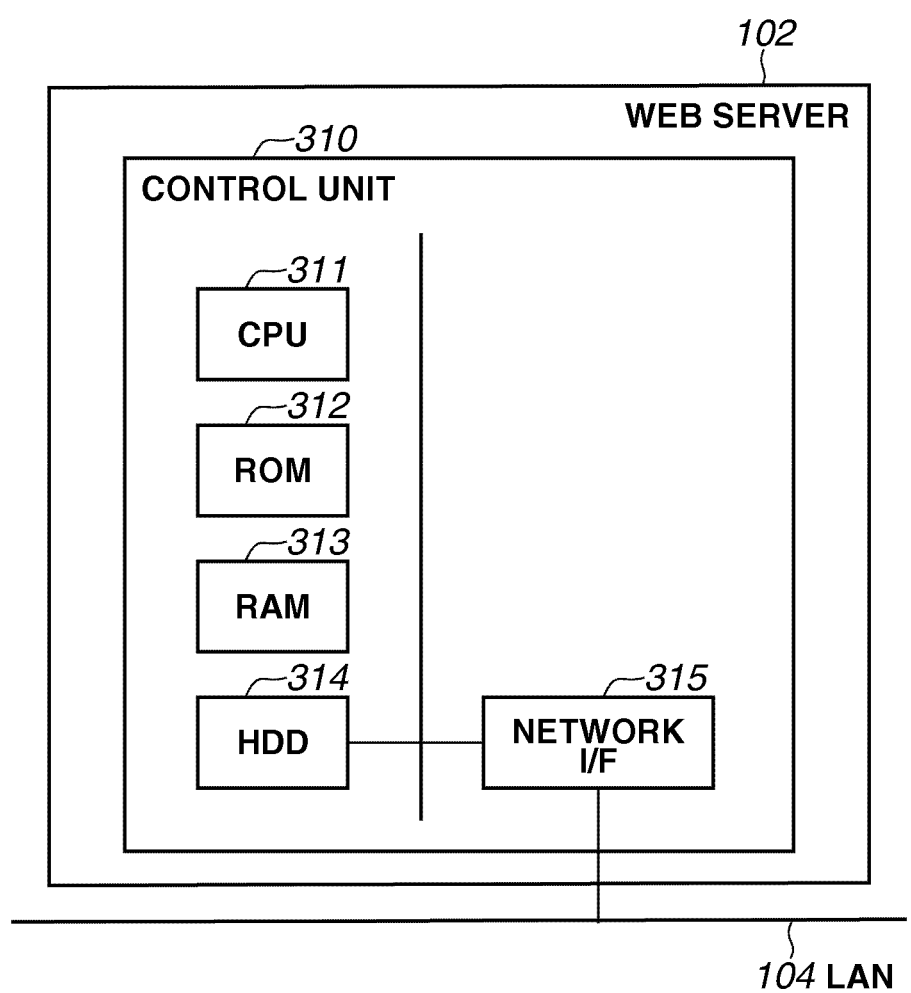
FIG. 3 is a block diagram illustrating a configuration of the web server according to the first exemplary embodiment of the present invention.

FIG. 3 is a block diagram illustrating the hardware configuration of the web server 102. Referring to FIG. 3, a control unit 310 including a CPU 311 controls the web server 102. The CPU 311 reads the control programs stored in a ROM 312 or an HDD 314 and performs various control processing. The ROM 312 stores information such as the control programs for executing the processes according to each of the flowcharts described below. A RAM 313 is used as the temporary storage area, such as the main memory or the work area of the CPU 311. The HDD 314 stores information such as the control programs for executing the processes according to each of the flowcharts described below, similar to the ROM 312.

A network I/F 315 connects the control unit 310 to the LAN 104. The network I/F 315 transmits to and receives from other apparatus (e.g., the MFP 101) on the LAN 104 various types of information.

Figure 4:
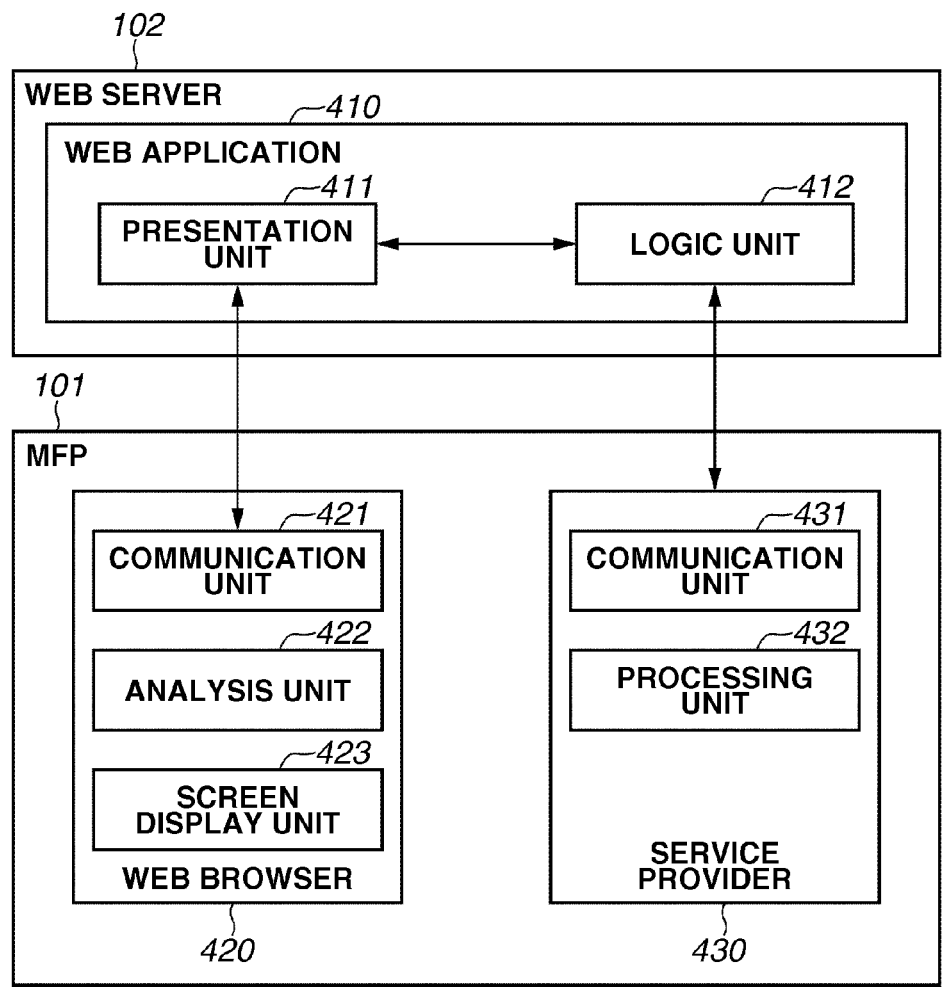
FIG. 4 is a block diagram illustrating a software configuration of the entire image processing system according to the first exemplary embodiment of the present invention.

FIG. 4 illustrates the software configuration of the entire image processing system according to the present exemplary embodiment. The software functions illustrated in FIG. 4 are realized by the CPU included in each of the MFP 101 and the web server 102 executing the control programs.

The software configuration of the MFP 101 will be described below. Referring to FIG. 4, the MFP 101 includes a web browser 420 and a service provider 430. The web browser 420 includes a communication unit 421, an analysis unit 422, and a screen display unit 423. The communication unit 421 communicates with a presentation unit 411 in a web application 410 via the network I/F 218 according to hypertext transfer protocol (HTTP). More specifically, the communication unit 421 requests the web application 410 for the operation screen which is to be displayed on the web browser 420, or notifies the web application 410 of the instruction from the user input via the operation screen.

The analysis unit 422 analyzes the HTML data received from the web application 410 via the network I/F 218. The HTML data includes the description indicating content of the operation screen to be displayed. The screen display unit 423 displays the operation screen on the operation unit 219 based on the analysis result acquired by the analysis unit 422. The web browser 420 is thus capable of displaying the operation screen provided by the external apparatus.

The service provider 430 includes a communication unit 431 and a processing unit 432. The communication unit 431 receives, from a logic unit 412 in the web application 410 via the network I/F unit 218, an execution instruction to execute the image processing function. If the communication unit 431 receives the execution instruction from the web application 410, the processing unit 432 causes the image processing system to perform the image processing function indicated by the received instruction. For example, if the received execution instruction indicates performing the reading process, i.e., reading the document and generating the image data, the processing unit 432 causes the scanner 221 to execute the reading process. Further, if the received execution instruction indicates performing image conversion of the image data, the processing unit 432 causes the image conversion unit 222 to perform the image conversion process.

The software configuration of the web server 102 will be described below. The web server 102 includes the web application 410 having the presentation unit 411 and the logic unit 412.

The presentation unit 411 communicates with the communication unit 421 via the network I/F 315, and transmits, in response to the request from the MPF 101, to the MFP 101 the operation screen to be displayed by the web browser 420 in the MFP 101. Further, the presentation unit 411 receives, from the MFP 101 via the network I/F 315, the content of the instruction input by the user via the operation screen displayed by the web browser 420 in the MFP 101.

Upon receiving the user instruction, the web application 410 performs various processes according to the content of the instruction, and requests the MFP 101, as necessary, to execute the image processing function. More specifically, the logic unit 412 generates and transmits to the MFP 101, the execution instruction indicating execution of the image processing function, to request execution of a printing processing, the reading processing, a transmission processing, or the image conversion processing.

As described above, if the web application 410 requests the MFP 101 to perform the image processing function, the logic unit 412 communicates with the communication unit 431 in the service provider 430 included in the MFP 101 via the network I/F 315. According to the present exemplary embodiment, the logic unit 412 communicates with the communication unit 431 according to simple object access protocol (SOAP).

The flow of the processing performed by the system according to the present exemplary embodiment will be described below.

FIG. 5 is a sequence diagram illustrating a flow of the processing performed when screen transition is generated by a user operation on the operation screen displayed on the operation unit 219 by the web browser 420. In step S501, the web browser 420 transmits the request for the operation screen to be displayed next to the web application 410.

In step S502, the web application 410 generates, in response to the request for the operation screen received in step S501, the screen information (e.g., the HTML data) for displaying the operation screen. The web application 410 then transmits the generated screen information to the web browser 420. Upon receiving the screen information, the web browser 420 displays the operation screen on the operation unit 219 according to the screen information. The processes illustrated in step S501 and step S502 are repeated each time the screen transition is generated.

FIGS. 6A, 6B, 6C, and 6D illustrate examples of the operation screen displayed by the web browser 420 in the above-described processes. The web browser 420 displays on the operation unit 219 each of the operation screens illustrated in FIGS. 6A, 6B, 6C, and 6D, according to the screen information received from the web application 410.

Figure 6A:
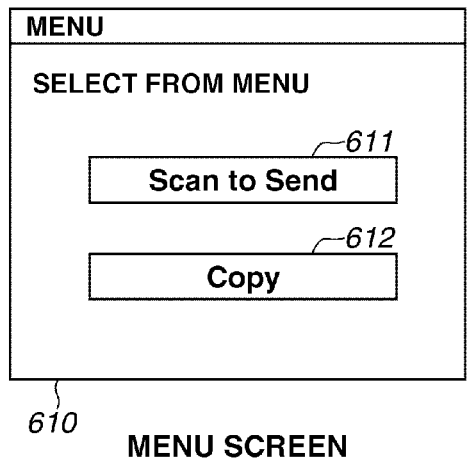
FIGS. 6A, 6B, 6C, and 6D illustrate examples of the operations screen according to the first exemplary embodiment of the present invention.

Referring to FIG. 6A, a menu screen 610 indicates a list of the image processing functions that are available for use in the MFP 101. A "Scan to Send" button 611 initiates a send function in which the network I/F 218 transmits to other apparatuses (e.g., the PC or other MFP) the image data generated by the scanner 221 reading the document. A "Copy" button 612 initiates a copy function in which the printer 220 prints the image data generated by the scanner 221 reading the document.

Figure 6B:
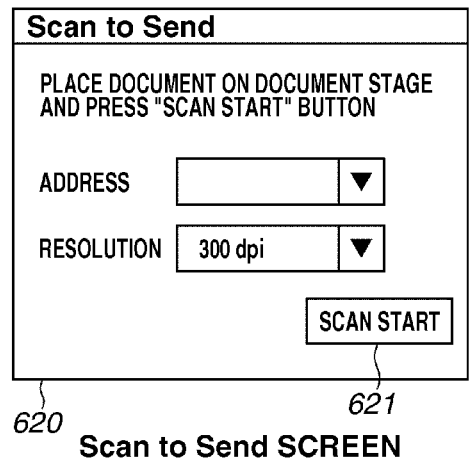

Referring to FIG. 6B, a Scan to Send screen 620 is the operation screen displayed when the user presses the "Scan to Send" button 611 on the menu screen 610 illustrated in FIG. 6A. If the user sets a setting value for reading the document (e.g., reading resolution) and presses a "scan start" button 621, the reading processing is performed by the scanner 221 reading the document and generating the image data.

Figure 6C:
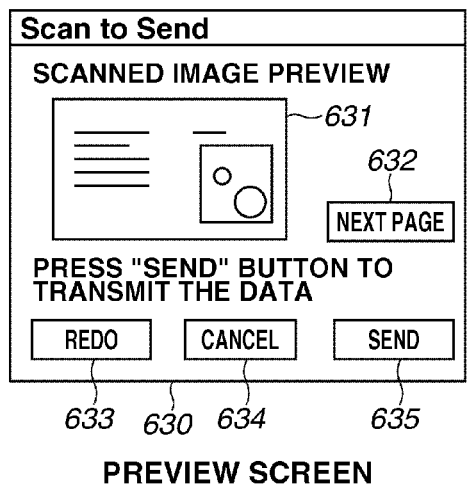

Referring to FIG. 6C, a preview screen 630 is the operation screen displayed after the user presses the "scan start" button 621 on the Scan to Send screen 620 illustrated in FIG. 6B, and the reading processing has been completed. The image data generated in the reading processing is displayed as a preview image 631. The user can determine, by confirming the preview image 631, whether the document has been read as the user has intended. If a plurality of documents has been read, the user can confirm the image data of the next page by pressing a "next page" button 632.

If the user desires to redo the reading process after confirming the preview image 631, the operation screen can be returned to the Scan to Send screen 620 by the user pressing a "redo" button 633. Further, the user can cancel performing the send function by pressing a "cancel" button 634. If the user confirms the preview image and determines that there is no problem, the user may press a "send" button 635. The transmission processing in which the network I/F 218 transmits the image to other apparatus is thus executed.

Figure 6D:
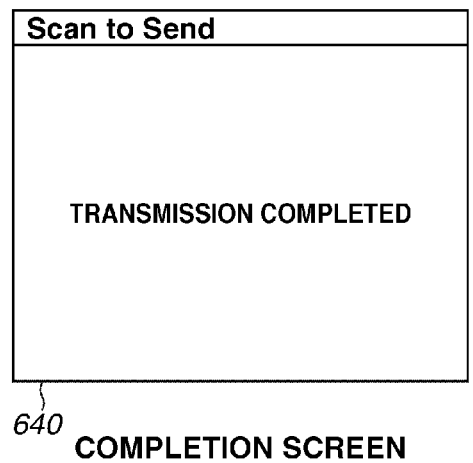

Referring to FIG. 6D, a completion screen 640 is the operation screen displayed after the user has pressed the "send" button 635 on the preview screen 630 illustrated in FIG. 6C, and the transmission processing has been completed.

According to the present exemplary embodiment, it is assumed that the web browser 420 that has received the screen information in step S502 of the sequence diagram illustrated in FIG. 5 displays the Scan to Send screen 620 illustrated in FIG. 6B using the screen information. If the user then presses the "scan start" button 621 on the Scan to Send screen 620, the process proceeds to step S503. In step S503, the web browser 420 notifies the web application 410 of the user pressing the "scan start" button 621. In such a case, the web browser 420 notifies the web application 410 of information indicating the setting values (e.g., the reading resolution) set by the user for reading the document.

Upon receiving the notification, the web application 410 generates, based on the notified content, the execution instruction for instructing execution of the image processing function included in the MFP 101. The execution instruction generated by the web application 410 indicates the reading processing in which the scanner 221 reads the document and generates the image data. The execution instruction also indicates the image conversion processing in which image conversion is performed to generate from the image data generated in the reading processing the preview image used in performing preview display. In step S504, the web application 410 then transmits to the service provider 430 the execution instruction. In such a case, the web application 410 transmits to the service provider 430 the information indicating the image size (e.g., numbers of pixels in a vertical direction and a horizontal direction) and an image data format, as information for generating the preview image (i.e., image conversion information).

In step S505, the service provider 430 that received the execution instruction performs the reading processing indicated by the execution instruction. More specifically, the scanner 221 reads the document and generates the image data which is then stored in the HDD 214. The image data stored in the HDD 214 is transmitted to the external apparatus on the LAN 104 or printed by the printer 220, according to the user operation.

In step S506, the service provider 430 performs the image conversion processing indicated by the execution instruction. More specifically, the image conversion unit 222 performs image conversion on the image data generated in the reading processing performed in step S505 to acquire the image data of the format or the image size notified in step S504. The converted image data is then temporarily stored in the RAM. 213.

After the service provider 430 completes the reading processing and the image conversion processing indicated by the execution instruction, the process proceeds to step S507. In step S507, the service provider 430 transmits the converted image data to the web application 410.

The web application 410 then generates the screen information for the web browser 420 to display the preview screen 630. The converted image data that the web browser 420 transmitted in step S507 is used as the image to be displayed as the preview image 631. In step S508, the web application 410 transmits the screen information for displaying the preview screen 630 to the web browser 420, and the web browser 420 displays the preview screen 630 on the operation unit 219 based on the screen information.

If the user presses the "send" button 635 on the preview screen 630, in step S509 the web browser 420 notifies the web application 410 of the user pressing the "send" button 635. Upon receiving the notification, the web application 410 generates the execution instruction for instructing execution of the transmission processing. In step S510, the web application 410 transmits the execution instruction to the service provider 430.

In step S511, the service provider 430 that received the execution instruction performs the transmission processing indicated in the execution instruction. More specifically, the network I/F 218 transmits the image data to other apparatuses. Upon completing the transmission process, the process proceeds to step S512. In step S512, the service provider 430 notifies the web application 410 of completion of the transmission process. The web application 410 that received the transmission completion notification generates the screen information for the web browser 420 to display the completion screen 640. In step S513, the web application 410 transmits the screen information to the web browser 420. The web browser 420 then displays the completion screen 640 on the operation unit 219 according to the received screen information.

The processing procedure performed when the user operates on the operation screen displayed by the web browser 420 on the operation unit 219 in the MFP 101 will be described below with reference to the flowchart in FIG. 7. Each of the steps S701 to S706 are performed by the CPU 211 in the MFP 101 executing the program stored in the memory, such as the ROM 212 or RAM 213.

In step S701, upon generation of the screen transition by a user operation, the web browser 420 transmits to the presentation unit 411 in the web server 102 the request for the screen information to be used in displaying the operation screen. In step S702, the web browser 420 receives the screen information from the presentation unit 411. In step S703, the web browser 420 displays the operation screen based on the received screen information. The examples of the operation screen displayed in step S703 are illustrated in FIGS. 6A, 6B, 6C, and 6D.

In step S704, the CPU 211 determines whether new screen transition has been generated by the user operation. If the CPU 211 determines that the new screen transition has been generated (YES in step S704), the process returns to step S701. On the other hand, if the CPU 211 determines that the new screen transition has not been generated (NO in step S704), the process proceeds to step S705.

In step S705, the CPU 211 determines whether the user has pressed an execution button, such as the "scan start" button 621 on the Scan to Send screen 620 or the "send" button 635 on the preview screen 630, for instructing execution of the image processing function. If the CPU 211 determines that the user has not pressed the execution button (NO in step S705), the process returns to step S704. If the CPU 211 determines that the user has pressed the execution button (YES in step S705), the process proceeds to step S706. In step S706, the communication unit 421 in the web browser 420 transmits to the web server 102 the request to execute the image processing function based on the user operation (i.e., pressing of the execution button) to notify the web server 102 that the user has pressed the execution button.

Figure 8:
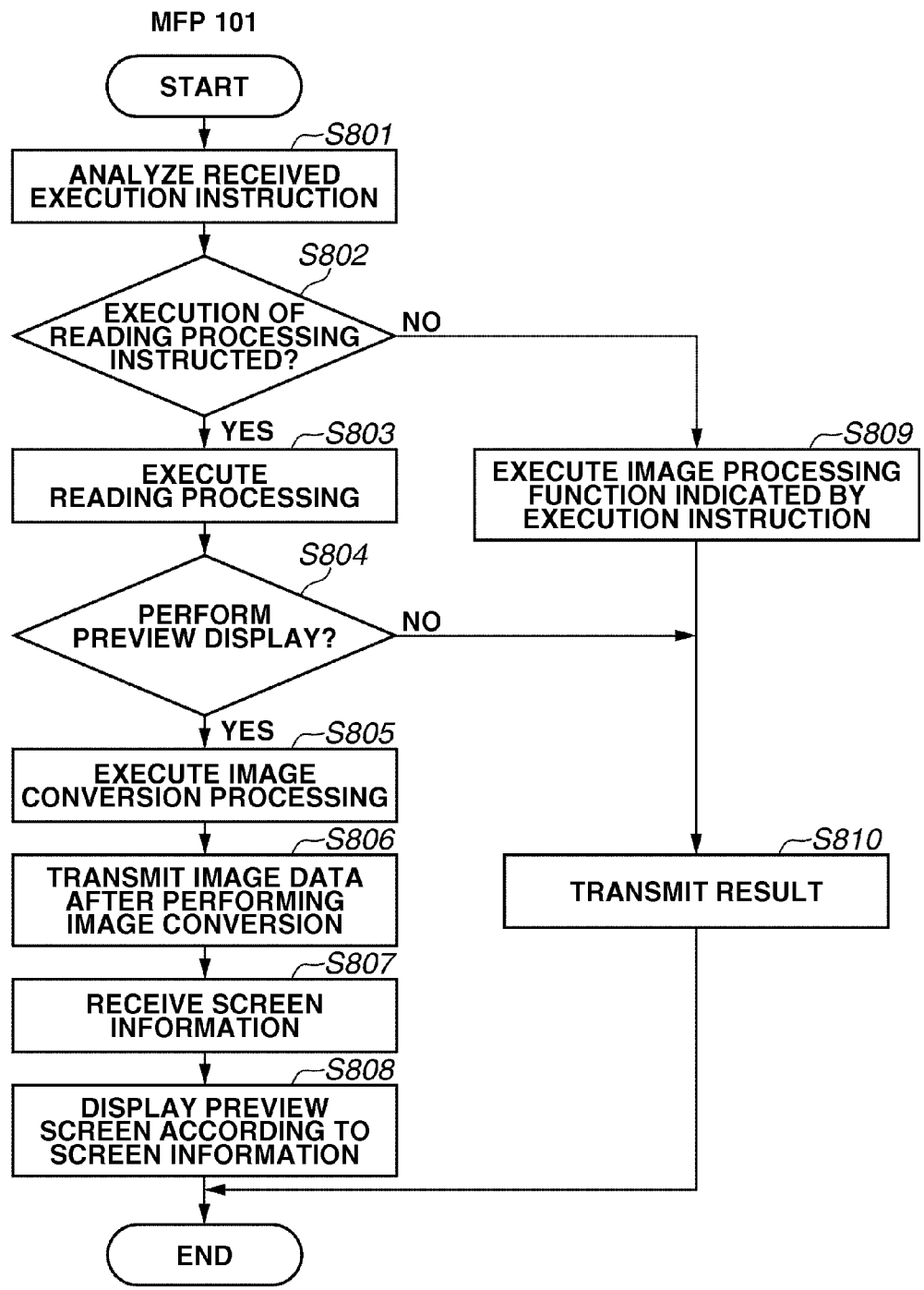
FIG. 8 is a flowchart illustrating the processing procedure performed by the MFP according to the first exemplary embodiment of the present invention.

Next, the processing procedure performed when the MFP 101 receives the instruction to execute the image processing function included in the MFP 101 from the web server 102 will be described below with reference to the flowchart illustrated in FIG. 8. Each of the steps S801 to S810 is performed by the CPU 211 in the MFP 101 executing the program stored in the memory, such as the ROM 212 or the RAM 213.

In step S801, the service provider 430 analyzes the received execution instruction. In step S802, the service provider 430 then determines whether the received execution instruction indicates execution of the reading processing by the scanner 221.

If the service provider 430 determines that the received execution instruction indicates execution of the image processing function other than the reading processing (NO in step S802), the process proceeds to step S809. In step S809, the service provider 430 performs control to execute the image processing function indicated by the execution instruction. More specifically, the service provider 430 causes the printer 220 to perform printing or the network I/F 218 to perform the transmission process. In step S810, the service provider 430 transmits to the web server 102 the result of executing the image processing function.

On the other hand, if the service provider 430 determines that the received execution instruction indicates execution of the reading processing (YES in step S802), the process proceeds to step S803. In step S803, the service provider 430 causes the scanner 221 to execute the reading processing. The image data generated in the reading processing is then stored in a specific area in the HDD 214 designated by the user. The image size of the image data generated in the reading processing performed in step S803 is different depending on a setting of the reading process (e.g., the reading resolution and a reading size). For example, if the scanner 221 reads an A4 size document at a reading resolution of 300 dpi, the image data of 2480 pixels by 3504 pixels is generated.

In step S804, the service provider 430 determines whether preview display of the image data generated in the reading processing is to be performed. According to the present exemplary embodiment, if the received execution instruction instructs execution of the image conversion processing by the image conversion unit 222 along with performing the reading processing, it is assumed that the service provider 430 determines that it is necessary to perform preview display of the image data generated in the reading process.

If the service provider 430 determines that preview display of the image data generated in the reading process is not to be performed (NO in step S804), the process proceeds to step S810. In step S810, the service provider 430 transmits to the web server 102 the result of executing the image processing. If the service provider 430 determines that preview display of the image data generated in the reading processing is to be performed (YES in step S804), the process proceeds to step S805. In such a case, the received instruction indicates execution of the image conversion process by the image conversion unit 222 along with performing the reading processing. Further, the received execution instruction includes the information indicating the image data format and the image size as information to be used in performing the image conversion processing.

In step S805, the service provider 430 causes the image conversion processing to be performed on the image data generated in the reading processing stored in the HDD 214, and generation of a preview image according to the received execution instruction.

More specifically, if the image size included in the execution instruction is 160 pixels by 220 pixels, the image conversion unit 222 performs the image conversion process so that the image size of the image data becomes 160 pixels by 220 pixels.

Further, if the information on the image data format included in the execution instruction indicates a joint photographic experts group (JPEG) format, the image conversion unit 222 performs the image conversion processing so that the image data format becomes the JPEG format.

In step S806, the service provider 430 then transmits to the web server 102 the converted image data as a request for the screen information to display the preview screen. In step S807, the web browser 420 receives the screen information from the web server 102. The received screen information is for displaying the preview screen, and includes the converted image data for displaying the preview image. In step S808, the web browser 420 displays the preview screen, e.g., the preview screen 630 illustrated in FIG. 6C, based on the screen information.

If the execution instruction that the MFP 101 receives from the web server 102 includes the information that indicates a same size as an area for displaying the preview image 631, it becomes unnecessary for the web server 102 to perform size conversion.

Figure 9:
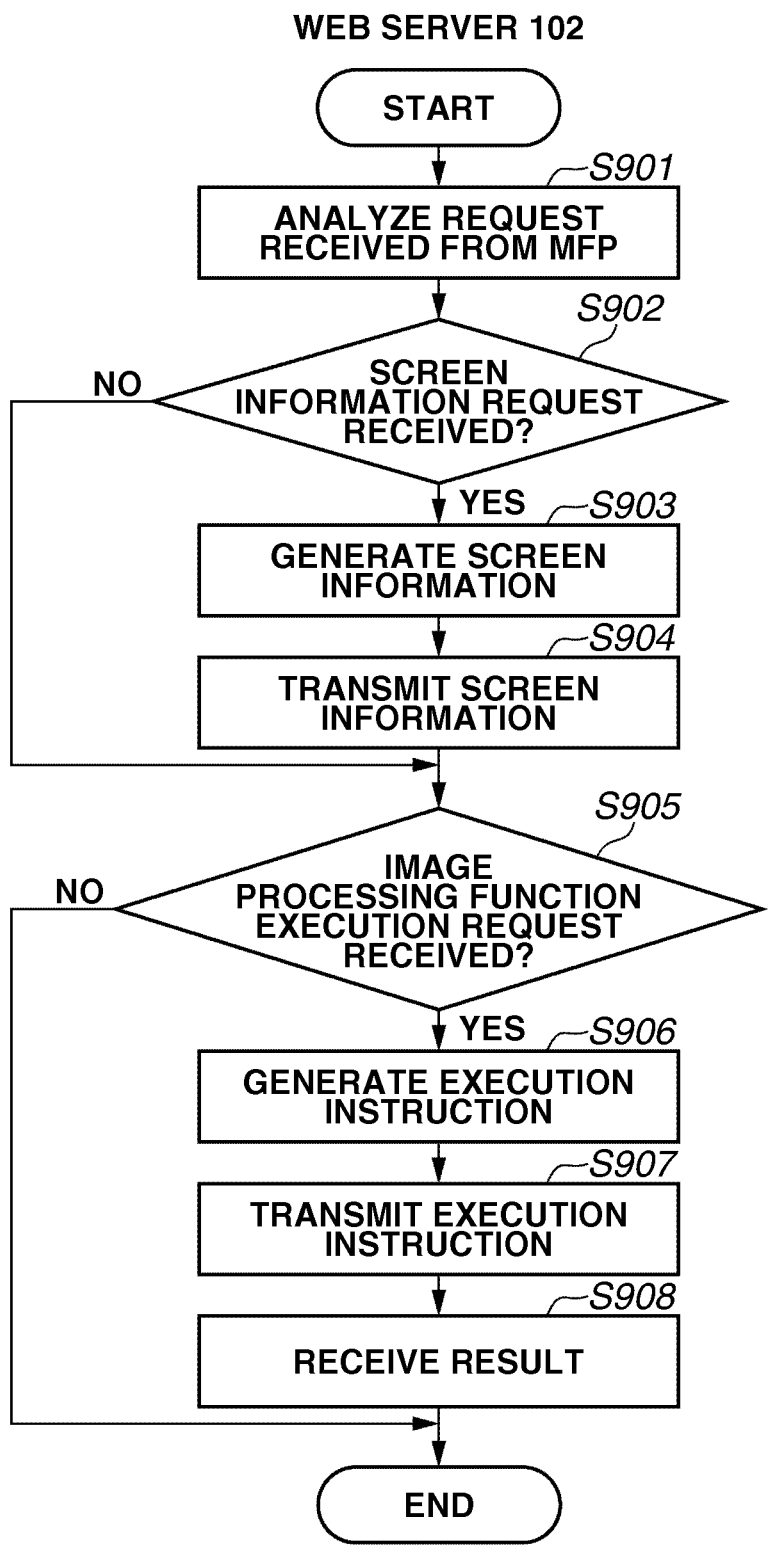
FIG. 9 is a flowchart illustrating a processing procedure performed by the web server according to the first exemplary embodiment of the present invention.

The processing procedure performed by the web server 102 when receiving the screen information request transmitted from the MFP 101 in step S701 illustrated in FIG. 7 and step S806 illustrated in FIG. 8, and the image processing function execution request transmitted from the MFP 101 in step S706 will be described below with reference to the flowchart in FIG. 9. Each of the steps S901 to S908 is performed by the CPU 311 in the web server 102 executing the program stored in the memory, such as the ROM 312 or the RAM 313.

In step S901, the presentation unit 411 in the web application 410 analyzes the request received from the MFP 101. In step S902, the presentation unit 411 determines whether the request received from the MFP 101 is the screen information request.

If the presentation unit 411 determines that the request received from the MFP 101 is the screen information request (YES in step S902), the process proceeds to step S903. On the other hand, if the presentation unit 411 determines that the request received from the MFP 101 is not the screen information request (NO in step S902), the process proceeds to step S905.

In step S903, presentation unit 411 generates the screen information in response to the request received from the MFP 101. If the MFP 101 is requesting the screen information for displaying the preview screen, the presentation unit 411 also receives the converted image data to be used as the preview image from the MFP 101. The presentation unit 411 uses the converted image data to generate the screen information for displaying the preview screen, such as the preview screen 630 illustrated in FIG. 6C.

If the screen information is generated in step S903 the process proceeds to step S904. In step S904, the presentation unit 411 transmits the screen information to the MFP 101.

In step S905, the presentation unit 411 determines whether the request received from the MFP 101 is the image processing function execution request. If the presentation unit 411 determines that the request received from the MFP 101 is the image processing function execution request (YES in step S905), the process proceeds to step S906. On the other hand, if the presentation unit 411 determines that the request received from the MFP 101 is not the image processing function execution request (NO in step S905), the process ends.

In step S906, the logic unit 412 generates the execution instruction corresponding to the received image processing function execution request. If the logic unit 412 generates the image processing function execution request for generating the preview image, the execution request includes the information indicating the image size or the image data format as the image conversion information for performing the image conversion processing.

If the execution request is generated in step S906 the process proceeds to step S907. In step S907, the logic unit 412 transmits the execution instruction to the MFP 101. In step S908, the logic unit 412 receives the result of executing the image processing function according to the execution instruction from the MFP 101.

As described above, according to the present exemplary embodiment, if the web server 102 generates the preview screen, the web server 102 transmits the image conversion information (e.g., the image size or format) to the MFP 101 for generating the preview image. As a result, the MFP 101 can perform image conversion (e.g., converts the image size or the format) on the image using the received image conversion information, and transmit the converted image data to the web server 102. Further, the web server 102 can receive the image data on which the image conversion processing has been performed according to the image conversion information transmitted thereby.

A second exemplary embodiment will be described below. According to the first exemplary embodiment, the web application 410 communicates with each of the web browser 420 and the service provider 430. In contrast, according to the present exemplary embodiment, the web application 410 transmits a response to the browser 420 where a script of the execution instruction for instructing execution of the image processing function to be transmitted to the service provider 430 is embedded.

Figure 10:
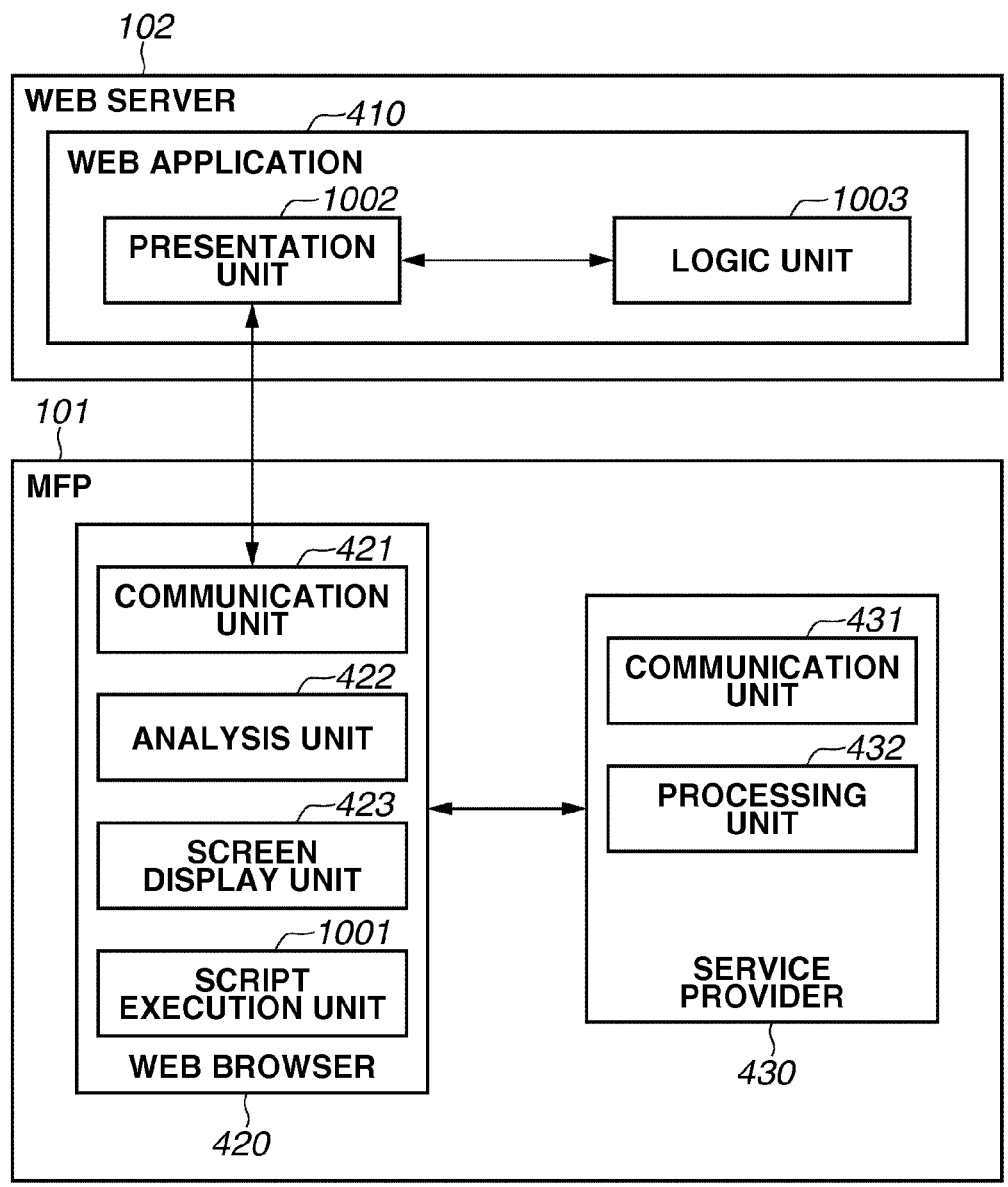
FIG. 10 is a block diagram illustrating the software configuration of the entire image processing system according to a second exemplary embodiment of the present invention.

FIG. 10 illustrates the software configuration of the entire image processing system according to the present exemplary embodiment. The software functions illustrated in FIG. 10 is realized by the CPUs (CPU 211 and CPU 311)included in the MFP 101 and the web server 102 respectively executing the control programs. The elements illustrated in FIG. 10 having the same reference numerals as those illustrated in FIG. 4 have the same functions, thus, a description of those elements is omitted herein.

Referring to FIG. 10, a presentation unit 1002 receives from the web browser 420 via the network I/F 315 the content of the instruction input by the user via the operation screen displayed on the web browser 420. A logic unit 1003 then embeds in the response to be transmitted from the presentation unit 102 to the web browser 420 as a script, the execution instruction for executing an image processing function corresponding to the instruction content. The presentation unit 1002 transmits the response to the web browser 420 via the network I/F 315.

A script execution unit 1001 in the web browser 420 executes the script embedded in the response, and transmits to the service provider 430 the execution instruction according to the result of executing the script. The service provider 430 thus causes the image processing function included in the MFP 101 to be executed according to the received execution instruction.

As described above, according to the present exemplary embodiment, the communication from the web application 410 to the service provider 430 is included in the response to the web browser 420. The communication can thus be performed even when there is a firewall between the MFP 101 and the web browser 102.

Other exemplary embodiments will be described below. According to the first and second exemplary embodiments, the preview image of the image data generated in the reading processing is described. However, the exemplary embodiments to which the present invention is applied are not limited to the above. For example, the present invention is applicable to the generation of the preview image of the image data stored in the storage medium such as the HDD 214 or a universal serial bus (USB) memory (not illustrated) connected to the image processing apparatus.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-038543 filed Feb. 24, 2011, which is hereby incorporated by reference herein in its entirety.

What is claimed is:

1. An image processing apparatus capable of communicating with a server, the image processing apparatus comprising:
a storing unit configured to store image data;
a first receiving unit configured to receive, from the server, processing information for performing image processing on first image data stored by the storing unit;
an image processing unit configured to perform image processing on the first image data based on the processing information to generate second image data;
a transmitting unit configured to transmit the second image data to the server;
a second receiving unit configured to receive, from the server, screen information generated by the server using the second image data; and
a displaying unit configured to display a preview screen of the first image data based on the screen information received by the second receiving unit.

2. The image processing apparatus according to claim 1, further comprising:
a reading unit configured to read a document and generate the image data,
wherein the storing unit is configured to store the image data generated by the reading unit.

3. The image processing apparatus according to claim 2, further comprising:
an instruction content transmission unit configured to transmit to the server a content of a user instruction input via an operation screen; and
an execution instruction receiving unit configured to receive from the server an execution instruction generated based on the content of the user instruction,
wherein the reading unit is configured to read a document and generate the image data according to the execution instruction.

4. The image processing apparatus according to claim 1, wherein the processing information is configured to indicate an image size of image data, and
wherein the image processing unit is configured to perform image processing on the first image data so that an image size of the first image data is an image size indicated in the processing information.

5. The image processing apparatus according to claim 1, wherein the image processing information is configured to indicate a format of image data, and
wherein the image processing unit is configured to perform image processing on the first image data so that a format of the first image data is a format indicated in the processing information.

6. A server apparatus capable of communicating with an image processing apparatus storing image data, the server apparatus comprising:
a first transmitting unit configured to transmit, to the image processing apparatus, processing information for the image processing apparatus performing image processing on the first image data;
a receiving unit configured to receive, from the image processing apparatus, second image data generated by the image processing apparatus performing image processing on the first image data based on the processing information;
a generation unit configured to generate second information for the image processing apparatus displaying a preview screen of the first image data using the second image data received by the receiving unit; and
a second transmitting unit configured to transmit, to the image processing apparatus, the screen information generated by the generating unit.

7. The server apparatus according to claim 6, wherein the processing information is configured to indicate an image size of the second image data.

8. The server apparatus according to claim 6, wherein the processing information is configured to indicate a format of the second image data.

9. A control method of an image processing apparatus capable of communicating with a server, the control method comprising:
storing image data;
receiving, from the server, processing information for performing image processing on first image data stored;
performing image processing on the first image data based on the processing information to generate second image data;
transmitting the second image data to the server;
receiving, from the server, screen information generated by the server using the second image data; and
displaying a preview screen of the first image data based on the screen information received.

10. A non-transitory computer-readable storage medium storing a program for causing an image processing apparatus to perform the image processing method according to claim 9.

11. A control method of a server apparatus capable of communicating with an image processing apparatus storing first image data, comprising:
transmitting, to the image processing apparatus, processing information for the image processing apparatus performing image processing on the first image data;
receiving, from the image processing apparatus, second image data generated by the image processing apparatus performing image processing on the first image data based on the processing information;

generating second information for the image processing apparatus displaying a preview screen of the first image data using the second image data received; and transmitting, to the image processing apparatus, the screen information generated.

12. A non-transitory computer-readable storage medium storing a program for causing an image processing apparatus to perform the control method of the server apparatus according to claim 11.

* * * * *